US008156728B2

(12) United States Patent
Hinz et al.

(10) Patent No.: US 8,156,728 B2
(45) Date of Patent: Apr. 17, 2012

(54) METHOD, DEVICE AND COMPUTER PROGRAM PRODUCT FOR DIAGNOSING OF AT LEAST ONE EXHAUST EMISSION CONTROL UNIT

(75) Inventors: Andreas Hinz, Onsala (SE); Lennart Andersson, Varberg (SE)

(73) Assignee: Volvo Lastvagnar AB, Göteborg (SE)

( * ) Notice: Subject to any disclaimer, the term of this patent is extended or adjusted under 35 U.S.C. 154(b) by 540 days.

(21) Appl. No.: 11/915,406

(22) PCT Filed: Jul. 7, 2005

(86) PCT No.: PCT/SE2005/001137
§ 371 (c)(1),
(2), (4) Date: Aug. 25, 2009

(87) PCT Pub. No.: WO2007/008121
PCT Pub. Date: Jan. 18, 2007

(65) Prior Publication Data
US 2010/0005786 A1 Jan. 14, 2010

(51) Int. Cl.
F01N 3/00 (2006.01)
(52) U.S. Cl. ............... 60/277; 60/274; 60/276; 60/286; 60/295; 60/297
(58) Field of Classification Search ............ 60/274, 60/276, 277, 286, 295, 297, 301, 303
See application file for complete search history.

(56) References Cited

U.S. PATENT DOCUMENTS

| 5,367,875 | A  | * | 11/1994 | Aboujaoude et al. | 60/303 |
| 6,167,698 | B1 | * | 1/2001 | King et al. | 60/286 |
| 6,470,673 | B1 | * | 10/2002 | van Nieuwstadt et al. | 60/274 |
| 7,571,599 | B2 | * | 8/2009 | Hirata | 60/286 |
| 7,677,032 | B2 | * | 3/2010 | Berryhill et al. | 60/297 |
| 7,743,605 | B2 | * | 6/2010 | Katou et al. | 60/287 |
| 2004/0011028 | A1 | | 1/2004 | Schnaibel et al. | |

FOREIGN PATENT DOCUMENTS

| EP | 0896136 A2 | 10/1999 |
| EP | 1460246 A2 | 9/2004 |
| GB | 2383004 A | 6/2003 |
| WO | 03033892 A1 | 4/2003 |
| WO | 2005024195 A1 | 3/2005 |

OTHER PUBLICATIONS

International Search Report for corresponding International Application PCT/SE2005/001137.
European Search Report for corresponding EP 05 75 7073.

* cited by examiner

Primary Examiner — Binh Q Tran
(74) Attorney, Agent, or Firm — WRB-IP LLP

(57) ABSTRACT

A method, device and computer program product are provided for diagnosing of a NOx-reducing catalyzer that can be regenerated and/or of a three-way valve for directing the flow of exhaust gases into a bypass pipe, and/or of a clean-up catalyzer. All the components can be included in one and the same exhaust emission control system. The diagnosing of the NOx-reducing catalyzer and of the three-way valve is carried out by method steps comprising measurement of the drop in pressure across the NOx-reducing catalyzer. The diagnosing of the clean-up catalyzer is carried out by method steps comprising measurement of the increase in temperature in the clean-up catalyzer. In the event of reduced functionality of the NOx catalyzer, a deSOx is carried out. A fault code is generated in the event of reduced functionality of the three-way valve or of the clean-up catalyzer.

19 Claims, 12 Drawing Sheets

METHOD, DEVICE AND COMPUTER PROGRAM PRODUCT FOR DIAGNOSING OF AT LEAST ONE EXHAUST EMISSION CONTROL UNIT

BACKGROUND AND SUMMARY

The present invention relates, in an aspect of the invention, to a method for diagnosing of the functionality of at least one NOx-adsorbing catalyzer (for example of the LNA type) during operation onboard a vehicle, which catalyzer is arranged in a vehicle comprising a combustion engine that, during operation, emits exhaust gases to an exhaust emission control system comprising said catalyzer.

The present invention also relates, in an aspect of the invention, to a engine-driven vehicle in which the above mentioned method is utilized and that, in addition, comprises a combustion engine that, during operation, emits exhaust gases to an exhaust emission control system comprising at least one NOx-adsorbing catalyzer, an injection device for injecting a reductant into the exhaust emission control system upstream of said catalyzer and a control unit for controlling at least the injection device.

The present invention also relates, in an aspect of the invention, to a computer program product containing a computer program intended for carrying out such a method using a computer.

Legislation concerning diesel engines has been made more stringent and will be made even more stringent in the future, in particular with regard to the emission of nitric oxide pollutants and particulates.

The quantity of nitric oxides that is created during the combustion of fuel in the cylinder of an engine is dependent upon the temperature at which the combustion takes place. Higher temperatures result in a greater proportion of the nitrogen in the air being converted to nitric oxides (NOx). The catalyzers that are used on diesel engines and other engines that operate with an excess of air are mostly oxidizing. As the exhaust gases contain oxygen, it is difficult to reduce the nitric oxides in a selective way. In addition to nitric oxides, unwanted emissions are also produced during the combustion process, including carbon monoxide (CO), hydrocarbon (HC) and particulates, primarily in the form of soot (C).

A known method for reducing the quantity of nitric oxides that is based on exhaust emission control is an LNA NOx trap (Lean NOx Adsorber). An LNA can also be called an LNT (Lean NOx Trap) or NAC (NOx Adsorber Catalyst). The technology is based on NO first being oxidized to NO2 in an oxidizing catalyzer, after which the NO2 is adsorbed in the trap in the form of nitrates. The adsorption of NO2 takes place when the engine is working with an excess of oxygen. The regeneration of the NOx trap takes place intermittently at predetermined intervals by letting the engine operate with a deficiency of oxygen, that is with an extra addition of hydrocarbon (reductant) and/or reduced airflow, which destabilizes the nitrates and reduces the nitrogen dioxide NO2 trapped in the NOx trap to nitrogen and water H2O. See for example U.S. Pat. No. 5,473,887 or U.S. Pat. No. 6,718,757. Both the adsorption and the regeneration require the temperature in the NOx trap to be sufficiently high (in excess of 2000 C for adsorption and approximately 3000 C for regeneration). With low loads on the engine (for example, driving in towns or an unloaded goods vehicle), the exhaust gas temperature will not be sufficient to keep the NOx trap at the required temperature. One way of forcing the temperature to suitable levels is to inject hydrocarbon (and/or CO or H2) into the exhaust gases that are then subjected to catalytic combustion in the NOx trap so that the correct temperature is attained.

The addition of a reductant can be carried out by an extra injection (post-injection) at the open exhaust gas valve in the engine or via an injector arranged on the exhaust pipe.

If, for some reason, the LNA has an unforeseen reduced NOx adsorption functionality, then an increased quantity of NOx will be released out into the atmosphere. For example, dependent upon the sulfur content (S) of the fuel, the NOx-reducing catalyzer will be sulfur poisoned sooner or later. Sulfur poisoning means that the sulfur forms sulfates that reduce the ability of the NOx-reducing catalyzer to adsorb nitrates. It is not possible to remove the sulfates by means of the abovementioned NOx regeneration process. In order to clean adsorbed sulfur from the NOx-reducing catalyzer, a so-called deSOx (sulfur regeneration) is performed, which involves a reduction of lambda and an increase in the temperature in the LNA to 600-7000 C. The carrying out of a deSOx is a known technique (see for example EP 1500800). A deSOx is not carried out as frequently as a NOx regeneration, but, on account of the high temperature, the procedure leads to a significant increase in the consumption of reductant, which means that, in those cases where the vehicle's fuel is used as the reductant, there is a significant increase in the fuel consumption.

In order to ensure that the functionality is maintained and hence that the requirements laid down in legislation are fulfilled, diagnosing can be carried out-of parts or the whole of the exhaust emission control system onboard and during operation of the vehicle.

EP 1174601 shows an example of a method for diagnosing of an exhaust emission control system based on measurements of temperature during operation of the vehicle. A predetermined quantity of hydrocarbon HC is injected periodically. The exotherm is measured by a temperature sensor, that is a recording of the "light-off" temperature is carried out, and on the basis of the measured temperature values, it is determined whether the exhaust emission control system has reduced functionality or not.

U.S. Pat. No. 6,519,930 shows an arrangement for NOx adsorption monitoring, testing and determination of the functionality of a NOx-reducing catalyzer by measuring the temperature before and after a predetermined regeneration of the NOx-reducing catalyzer. The difference between the measured temperature values provides an indication of the performance of the NOx-reducing catalyzer.

In a NOx trap, in addition to NOx, sulfates can also be adsorbed (see above) in various quantities depending upon the sulfur content in the fuel. A disadvantage of the known technology is that there is no satisfactory diagnosis procedure for this with associated program of remedial measures. Another disadvantage of the known technology with diagnosis procedures based on the measurement of temperatures is that it takes time for the heat from the regeneration to spread through the material and to reach the temperature sensor. The measurement of the temperature thus takes place with a certain calculated delay, which results in a major uncertainty for a system based on the measurement of temperatures. A more direct way of determining the exotherm is to measure the drop in pressure across the catalyzer. Measurement of the drop in pressure is known through, for example, U.S. Pat. No. 3,766,536.

U.S. Pat. No. 3,766,536 shows a catalyzer (not of LNA type) that can have NOx-reducing functionality. The drop in pressure across the catalyzer is measured continually during the operation of the vehicle by pressure sensors. When the measured drop in pressure is less than a certain predetermined value, this is an indication that the functionality of the catalyzer is reduced to some extent. This does not include any further monitoring and remedial measures concerning the functionality of the catalyzer. The device according to U.S. Pat. No. 3,766,536 can only provide an indication that the functionality of the catalyzer is reduced.

There are also solutions with a so-called NOx sensor, that is where the NOx content is measured directly after the LNA. A NOx sensor is, however, relatively expensive and relatively likely to go wrong.

It is desirable to carry out diagnosing of the functionality of at least one NOx-adsorbing catalyzer onboard and during operation of the vehicle and, in the event of finding a reduction in the performance of the catalyzer, to take measures by means of predetermined steps to try to improve the performance of the catalyzer automatically onboard and during operation of the vehicle with the aim of further minimizing unwanted overall exhaust gas emissions. In exhaust emission control systems with bypass pipes and bypass valves, it is also desirable to carry out diagnosing of the bypass valve. It is also desirable in exhaust emission control systems with clean-up catalyzers to carry out diagnosing of the clean-up catalyzer.

The method according to an aspect of the invention comprises a method carried out during operation onboard a vehicle for diagnosing of at least a part of an exhaust emission control system arranged in a vehicle with a combustion engine that emits exhaust gases during operation to said exhaust emission control system. The exhaust emission control system comprises at least one $NO\chi$-reducing catalyzer that can be regenerated and, during at least a predetermined period of time, a predetermined quantity of reductant is added to the exhaust emission control system upstream of at least the NOx-reducing catalyzer for regeneration of the NOx-reducing catalyzer. A drop in pressure across the NOx-reducing catalyzer is measured. The method is characterized by the following steps:

a first measurement and recording is carried out of a first measured value for the drop in pressure at a point in time immediately before the reductant is added to the exhaust emission control system;

a second measurement and recording is carried out of a second measured value for the drop in pressure at a point in time after the completion of the regeneration;

a comparison is carried out between said first and second values, after which a deSOx is carried out if the increase in the drop in pressure between the first and second measured values is less than a first predetermined value.

An advantage that is obtained with the method according to an aspect of the invention is that a deSOx is only carried out when it is actually necessary. In this way, the consumption of reductant is minimized. In an embodiment with an exhaust emission control system with double NOx-reducing catalyzers arranged in parallel, the consumption of reductant can be reduced still further.

An aspect of the invention also comprises a device in the form of a engine-driven vehicle with an exhaust emission control system where there is diagnosing of the NOx-reducing catalyzer according to the present invention. The same advantages are obtained with the device according to an aspect of the invention as with the method according to an aspect of the invention.

In an alternative embodiment of the method and the device according to an aspect of the invention, a bypass pipe is arranged to take the exhaust gases past said NOx-reducing catalyzer when required and a three-way valve is arranged to direct all or parts of the exhaust gases via said NOx-reducing catalyzer or via said bypass pipe. A clean-up catalyzer is arranged downstream of the $NO\chi$-reducing catalyzer and the bypass pipe. According to an aspect of the invention, in addition to the abovementioned method steps, a control unit is arranged also to carry out the following steps:

the three-way valve is moved to a predetermined position where a partial flow of the exhaust gases is directed in through the NOx-reducing catalyzer and the remaining flow of the exhaust gases is taken past the NOx-reducing catalyzer through the bypass pipe;

a greater quantity of reductant is injected in comparison with what is required for a satisfactory NOx regeneration;

a measurement and recording is carried out of an increase in temperature in the clean-up catalyzer; a comparison is carried out between said measured increase in temperature and a stored reference value for the minimum acceptable increase in temperature in the clean-up catalyzer, with a fault code being generated if the measured increase in temperature is less than said reference value for the minimum increase in temperature.

The advantage of this embodiment is that, in exhaust emission control systems with clean-up catalyzer, diagnosing of the clean-up catalyzer can be carried out using the same injection devices for reductant that are used for regeneration of the NOx-reducing catalyzer.

In yet another alternative embodiment of the method and device according to an aspect of the invention, an additional NOx-reducing catalyzer comprised in the exhaust emission control system is arranged on the bypass pipe. The control unit is here arranged to use each said NOx-reducing catalyzer, with associated part of the exhaust pipe, alternately as a bypass pipe for diagnosing of the clean-up catalyzer. Thus, the system does not need to use the same exhaust pipe with associated NOx-reducing catalyzer each time as a bypass for diagnosing of the clean-up catalyzer.

In another alternative embodiment of an aspect of the invention, the control unit is arranged to record at least a second increase in the drop in pressure based on the difference between a third measured value and said first measured value for the drop in pressure across the $NO\chi$-reducing catalyzer, with a fault code being generated only if said second increase in the drop in pressure is also less than said first predetermined value. By carrying out at least two test cycles, a better statistical basis is obtained for the diagnosis.

In yet another alternative embodiment of an aspect of the invention, the degree of aging of the NOx-reducing catalyzer is recorded and compared with stored values for the corresponding minimum quantity of reductant that is required to obtain a satisfactory NOx regeneration for the NOx-reducing catalyzer. The control unit is here arranged to select the quantity of injected reductant according to said stored value corresponding to the aging of the NOx-reducing catalyzer. This provides the advantage of additional savings in the consumption of reductant.

In an alternative embodiment of the method and the device according to an aspect of the invention, this comprises a combustion engine that, during operation, emits exhaust gases to an exhaust emission control system, in which the exhaust emission control system comprises at least one NOx-reducing catalyzer that can be regenerated, a bypass pipe arranged to take, when required, the exhaust gases past said NOx-reducing catalyzer and a three-way valve arranged to direct all or parts of the exhaust gases via said NOx-reducing catalyzer or via said bypass pipe, injection devices arranged upstream of the NOx-reducing catalyzer and downstream of the three-way valve for injecting a reductant into the exhaust emission control system, a pressure sensor for measuring the drop in pressure across the NOx-reducing catalyzer, a control unit for recording the signal from the pressure sensor and for control of at least the injection device. An aspect of the invention is characterized in that the control unit is arranged to: move the three-way valve to an expected predetermined position according to control signals for controlling the three-way valve; record a measured value for the drop in pressure at a point in time during the time that the reductant is being added to the exhaust emission control system; compare said measured value for the drop in pressure and a stored value that corresponds to a drop in pressure with a correctly functioning three-way valve; and is characterized in that the control unit is arranged to generate a fault code for the three-way valve if the difference between said measured value and the stored value is greater than a first predetermined value.

The pressure sensor can thus also be used for diagnosing of a three-way valve in an exhaust emission control system with a bypass pipe or other parallel pipes. By using the same components for several diagnosis purposes, the diagnosis system can be made more efficient for a complete exhaust emission control system. In an alternative embodiment, one and the same regeneration is used for both diagnosing of the three-way valve and of the NOx-reducing catalyzer.

In an alternative embodiment of the method and the device according to an aspect of the invention, diagnosing according to an aspect of the invention (see above) of the three-way valve and the clean-up catalyzer is combined in one and the same exhaust emission control system. An advantage of this is that parts of the diagnosing of the three-way valve can be carried out at the same time as the diagnosing of the clean-up catalyzer. In an alternative embodiment comprising said diagnosing of the three-way valve and of the clean-up catalyzer, an additional NOx-reducing catalyzer comprised in the exhaust emission control system is arranged on the bypass pipe in the same way as described above. In this way, the control unit can also here be arranged to use each said NOx-reducing catalyzer, with associated part of the exhaust pipe, alternately as a bypass pipe for diagnosing of the clean-up catalyzer or of the three-way valve.

In yet another alternative embodiment of the method and device according to an aspect of the invention, the diagnosing according to an aspect of the invention (see above) of the three-way valve, the clean-up catalyzer and the NOx-reducing catalyzer are combined in one and the same exhaust emission control system. In this way, a relatively complete diagnosis system is obtained for all the components comprised in the exhaust emission control system and for the most important components. An embodiment of an aspect of the invention includes both double NOx-reducing catalyzers arranged in parallel (as described above) and all the diagnosing according to an aspect of the invention, that is diagnosing of the three-way valve, the clean-up catalyzer and the NOx-reducing catalyzer. In this embodiment, the greatest possible benefits are obtained as a result of coordination of the components that are required for the respective type of diagnosis. In addition, in this embodiment, the greatest possible effect is obtained with the smallest number of components with which all the abovementioned diagnosing can be carried out in an exhaust emission control system.

According to an embodiment of an aspect of the invention, the diagnosing of the three-way valve can be carried out after the combustion engine has been switched off for a predetermined number of hours (cold start). This is in order to obtain steady state conditions for carrying out the diagnosis with more reliable diagnosis results.

DETAILED DESCRIPTION

Figure 1:
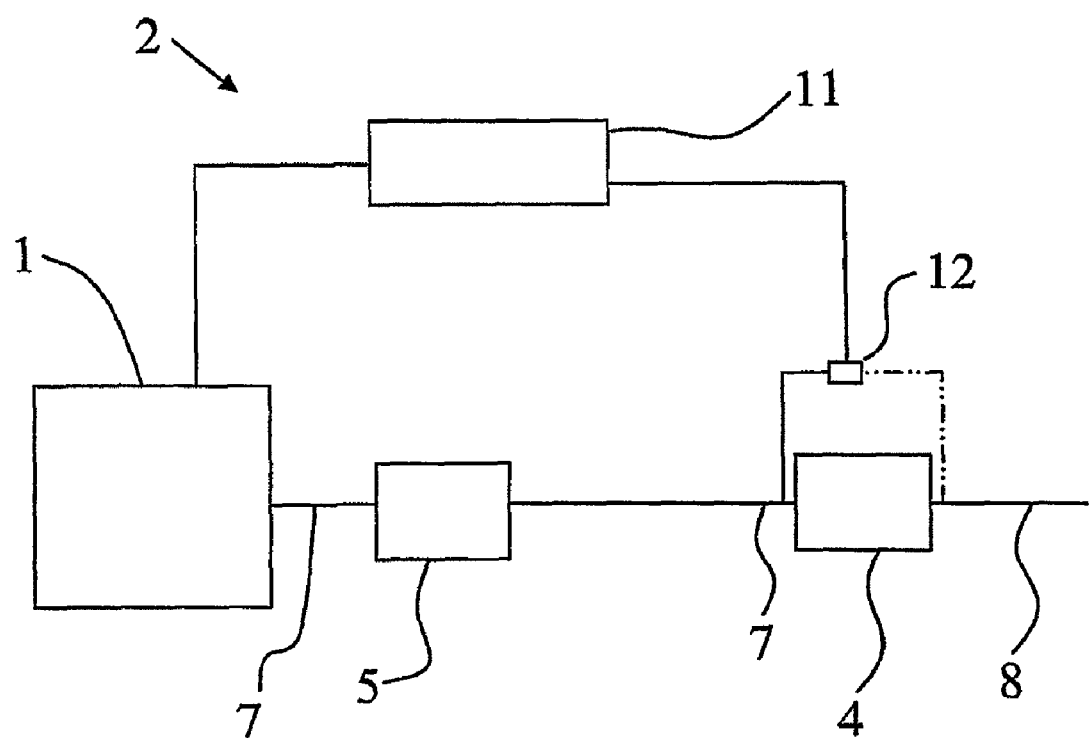
FIGS. 1, 6, 9 and 11 each show a schematic illustration of two different preferred embodiments of an exhaust emission control system according to an aspect of the invention.

FIG. 1 shows a preferred embodiment of an aspect of the invention in which the outgoing combustion gases from a combustion engine 1 are taken into an exhaust emission control system, represented in general by 2. The engine 1 is an engine that works with an excess of oxygen, for example a diesel engine of the piston-cylinder type, in which the excess of oxygen in the exhaust gases from the engine 1 is used to reduce at least the quantity of NOx in the exhaust gases before they are released into the atmosphere. The exhaust emission control system 2 is arranged to reduce at least the quantity of nitric oxides in the exhaust gases from the engine 1. The main components in the exhaust emission control system 2 comprise an oxidizing catalyzer 5 and a NOx-reducing catalyzer 4, in the embodiment illustrated, the NOx catalyzer 4 is of the LNA type. The exhaust gases from the engine 1 are taken in turn via an exhaust pipe 7 through a first step in the form of the oxidizing catalyzer 5 and a second step in the form of the NOx-reducing catalyzer 4. From the NOx-reducing catalyzer 4, the exhaust gases are taken out into the atmosphere via the end pipe 8.

The exhaust gases from the engine 1 typically comprise various nitric oxides NOx, such as NO and NO2, and also hydrocarbon HC, carbon monoxide CO, carbon dioxide CO2, particulates and other combustion residues. The oxidizing catalyzer 5 in the first step is preferably coated with noble metals such as platinum or palladium. When functioning normally, the oxidizing catalyzer 5 oxidizes most of the NO in the exhaust gases to NO2. The reaction in the first step is shown by formula 1:

$$NO + \tfrac{1}{2}O_2 \rightarrow NO_2 \qquad \qquad 1)$$

The exhaust gases from the oxidizing catalyzer 5 then pass on to the second step, that is the NOx catalyzer 4. In the embodiment illustrated, the NOx catalyzer 4 is a LNA, that is a NOx trap that is arranged to collect NO2 in oxygen-rich conditions, which NOx catalyzer 4, with the addition of a reductant, reduces the nitrogen dioxide NO2 trapped in the NOx trap to nitrogen N2 and water H2O in gaseous form. The main process in step two can be shown by the formula 3:

$$3NO_2 + 2H_2C \rightarrow \tfrac{1}{2}N_2 + 2H_2O + 2CO_2 \qquad \qquad 3)$$

In the embodiment shown, said reductant or heating agent preferably comprises the fuel for the engine 1 and can be stored in a single tank (not shown) in the vehicle in order to be injected when required into the exhaust pipe 7 by means of an injector (not shown) arranged upstream of the oxidizing catalyzer 5. The injector is controlled by a control unit 11, that can also be arranged to control the combustion process of the engine 1. In an alternative embodiment, the reductant can be injected by means of an injector arranged between the oxidizing catalyzer 5 and the NOx-reducing catalyzer 4. In yet another alternative embodiment, the reductant can be injected by means of the engine's 1 ordinary fuel injectors (not shown). In this embodiment, the hydrocarbon preferably comprises the vehicle's ordinary fuel and is injected suitably by means of so-called post-injection, which is monitored and controlled by the control unit 11.

In the embodiment shown, the control unit 11 receives signals from a pressure sensor 12 arranged to measure the drop in pressure across the NOx-reducing catalyzer 4 in a known way.

Figure 2:
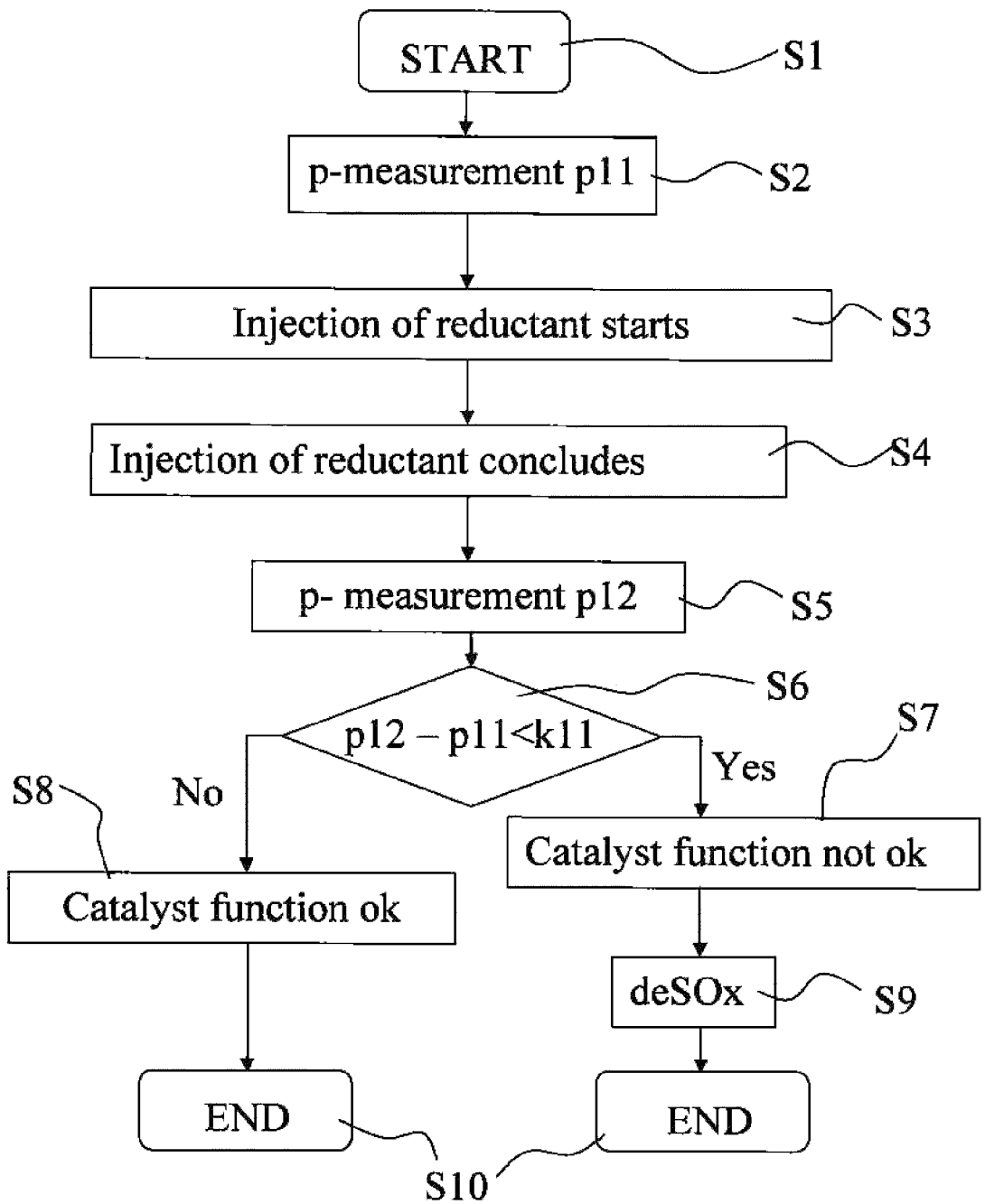
FIGS. 2, 4, 8 and 10 show flow charts for the respective embodiments shown in FIGS. 1, 6, 9 and 11.

According to the present invention, according to an embodiment, diagnosing of the NOx-reducing catalyzer 4 can be carried out according to the flow chart shown in FIG. 2. According to an aspect of the invention, the control unit 11 is programmed to carry out at least the steps shown in FIG. 2. When the control unit 11 determines that a certain period of operation has passed since the last NOx regeneration was carried out and that a relatively steady engine state is expected to last for the immediate future, the diagnosis in S1 in FIG. 2 is commenced. In step S2, the control unit 11 carries out a measurement of the drop in pressure across the catalyzer 4 by means of a pressure sensor 12. When a first value pl1 or the drop in pressure across the catalyzer 4 has been measured and stored in the control unit 11, the control unit 11 starts the injection of reductant in step S3 with the aim of regenerating the NOx catalyzer 4 and thereby releasing nitrogen N2. The injection of hydrocarbon can be carried out by, for example, a post-injection using the engine's 1 ordinary fuel injectors (not shown) or by injectors (not shown) arranged on the exhaust pipe 7, which injectors are arranged on the exhaust pipe at least upstream of the NOx catalyzer 4. The quantity of injected hydrocarbon and the injection time are predetermined and adapted in accordance with the conditions and the time that the NOx catalyzer 4 has been in operation since the last NOx regeneration was carried out. Such optimization of injected hydrocarbon provides better control of the fuel consumption, while at the same time ensuring a good NOx regeneration.

Figure 3:
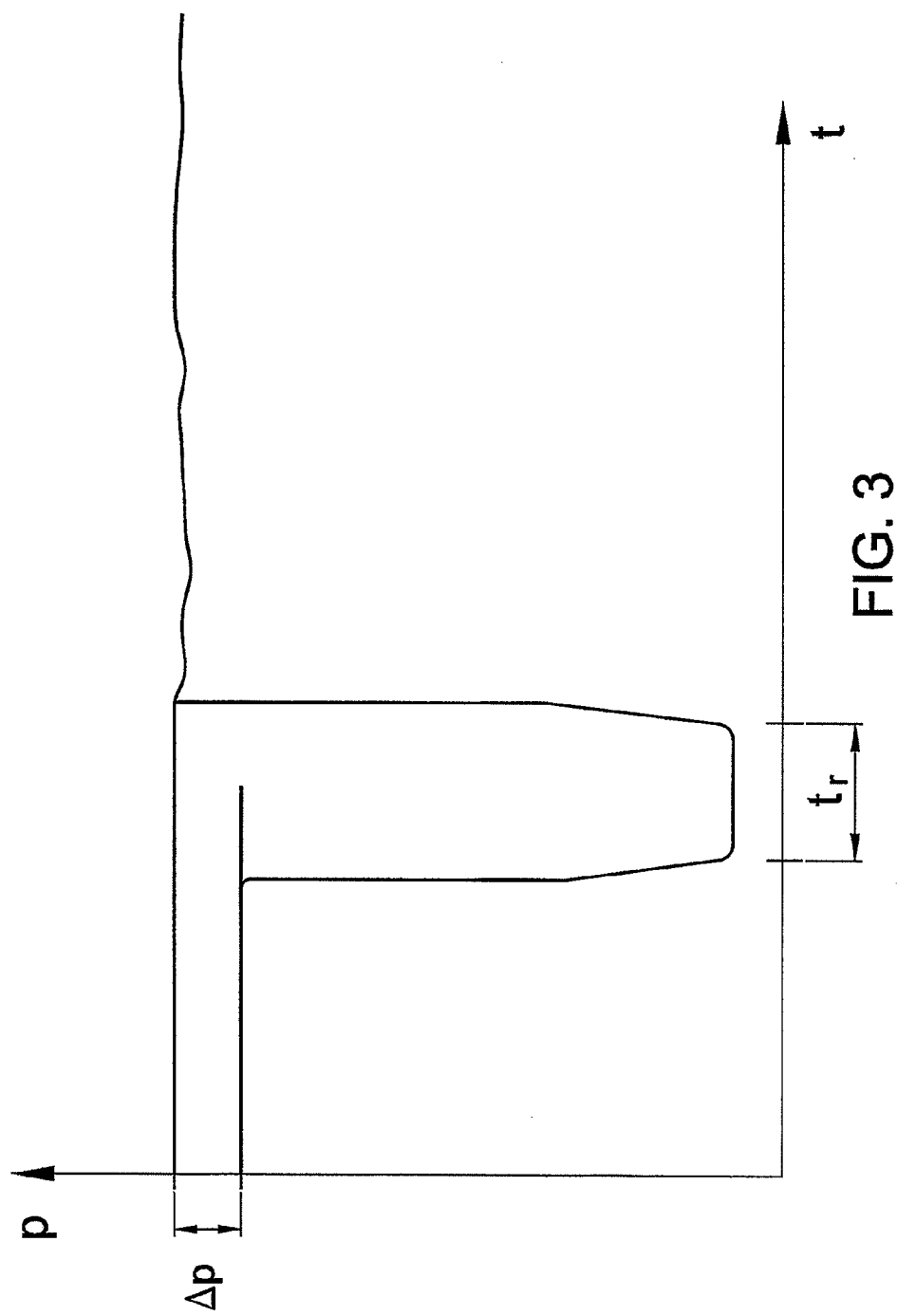
FIGS. 3 and 7 show a diagram of how the pressure varies over time in a catalyzer according to the different embodiments according to an aspect of the invention.

In step S4, the control unit 11 concludes the injection of the hydrocarbon. Thereafter, the control unit 11 carries out a new measurement of the drop in pressure across the NOx catalyzer 4 and a new value for the drop in pressure pl2 is stored in step S5. In step S6, the control unit 11 carries out a calculation of the difference between the measured values pl1 and pl2 and then compares the difference with a predetermined value kl1. For normal functionality of the NOx catalyzer, the calculated difference is relatively large, as stored NOx has been reduced by the reductant which has given rise to a change in state in the catalyzer that affects the drop in pressure. FIG. 3 shows how the drop in pressure p for the NOx catalyzer 4 according to the above varies over the time t immediately before, during and immediately after a regeneration of a NOx catalyzer 4 with normal functionality. The term $\delta p$ represents the difference between the lower value pl1 and the higher value pl2. The time tr stands for the length of time for the NOx regeneration.

If, however, the functionality of the NOx catalyzer is reduced, then the difference will be less or in the worst case hardly able to be measured. The worse the functionality of the NOx catalyzer, the smaller the difference $\delta p$ between the measured values pl2 and pl1. If the difference $\delta p$ is calculated to be smaller than a certain predetermined value kl1 (limit value), then, according to the embodiment in FIGS. 1 and 2, the control unit 11 is arranged to determine in step S7 that the NOx catalyzer 4 is not functioning satisfactorily, whereupon the control unit 11 carries out a deSOx in the NOx catalyzer 4 in step S9. If, on the other hand, the control unit 11 calculates in S6 that the difference is greater than the predetermined value kl1, then the control unit 11 determines instead, in step S8, that the NOx catalyzer is functioning satisfactorily, which means that no further measures need to be taken to improve the performance of the NOx catalyzer. In S10, the control unit 11 concludes the cycle according to the embodiment in FIG. 2.

The predetermined value kl1 is arrived at taking into account the working order of the NOx catalyzer. A sufficiently large increase in the drop in pressure $\delta p$ (according to the above) shows in a simple and reliable way that the NOx catalyzer is functioning satisfactorily.

The state of the engine 1 should be relatively steady from the time the measurement in step S2 is commenced up to and including the time when the measurement in step S5 is completed, in order for good measurement values to be obtained. The control unit 11 can be arranged to carry out the measurements when the engine 1 is working within a certain load range, that is such that the flow of exhaust gases from the engine 1 lies within the measuring range of the pressure sensor 12 and such that the catalyzer 4 is within its operating temperature range. In a preferred embodiment, after the measurements in S2 and S5 have been carried out, the control unit 11 can be given the opportunity to determine whether the state of the engine 1 has changed while the measurements were being taken or not. If there has been a large change in the state of the engine 1 during the time that the measurements were being taken, the control unit 11 can be arranged to reject the result of the measurements (filtering) and to select to carry out at least one or more additional new cycles of measurements and comparisons of calculated differences in relation to kl1 in connection with future NOx regenerations. Several completed cycles provide a better statistical basis for diagnosing of the functionality of the NOx catalyzer. The control unit 11 can be arranged to calculate a difference between the measured drop in the pressure values only if the flow of exhaust gases is within a certain deviation range at the point in time of the two measurements of the drop in pressure or, alternatively, the signals from the pressure sensor 12 at the point in time of the two measurements of the drop in pressure are standardized in relation to a measured flow of exhaust gases.

In an alternative embodiment, in step S6, in order to calculate a difference, the control unit 11 can be arranged instead to calculate the quotient between the measured values pl1 and pl2. If the quotient is closer to the value 1 than a certain predetermined value kl1, this can be an indication of reduced catalyzer functionality.

Figure 4:
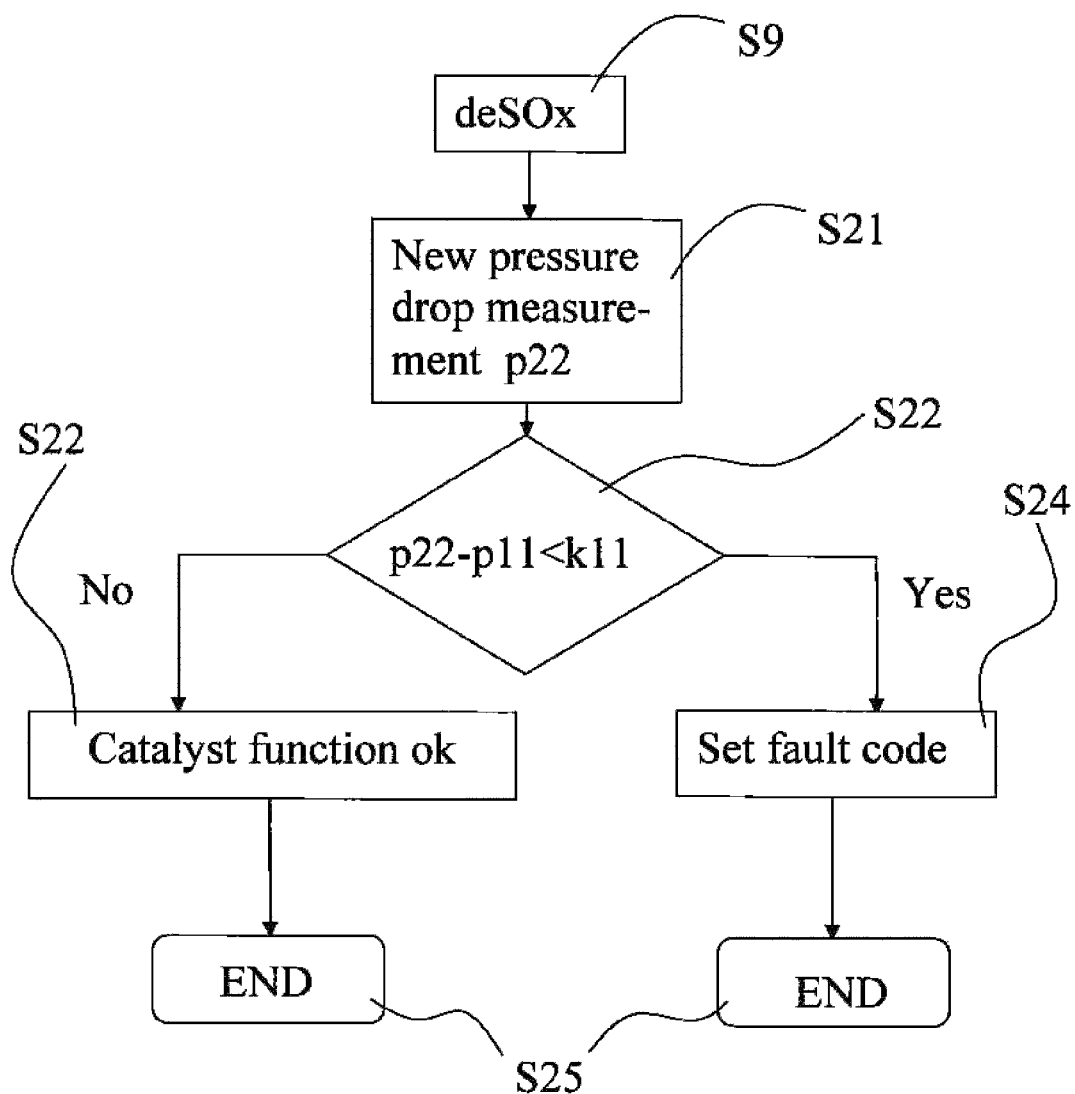

FIG. 4 shows yet another alternative embodiment of an aspect of the invention containing additional steps that the control unit 11 can be arranged to carry out if the catalyzer functionality is not found to be satisfactory according to S7 in FIG. 2. In this embodiment, after the determination in step S7 and deSOx according to S9, the control unit 11 is arranged to carry out a new measurement of drop in pressure and storage of the value p22 in step S21. The control unit 11 thereafter carries out a new calculation of the difference between p22 and the previously recorded pl1, which calculation is followed by a comparison of the new difference with the stored limit value kl1 in step S22. If the new calculated difference is less than kl1, the control unit 11 generates a fault code in step S24. If instead, the difference is greater than kl1, the control unit 11 indicates in step S23 that the catalyzer is functioning satisfactorily. When the control unit 11 has processed step S23 or S24, the end of the program is reached in step S25.

Figure 5:
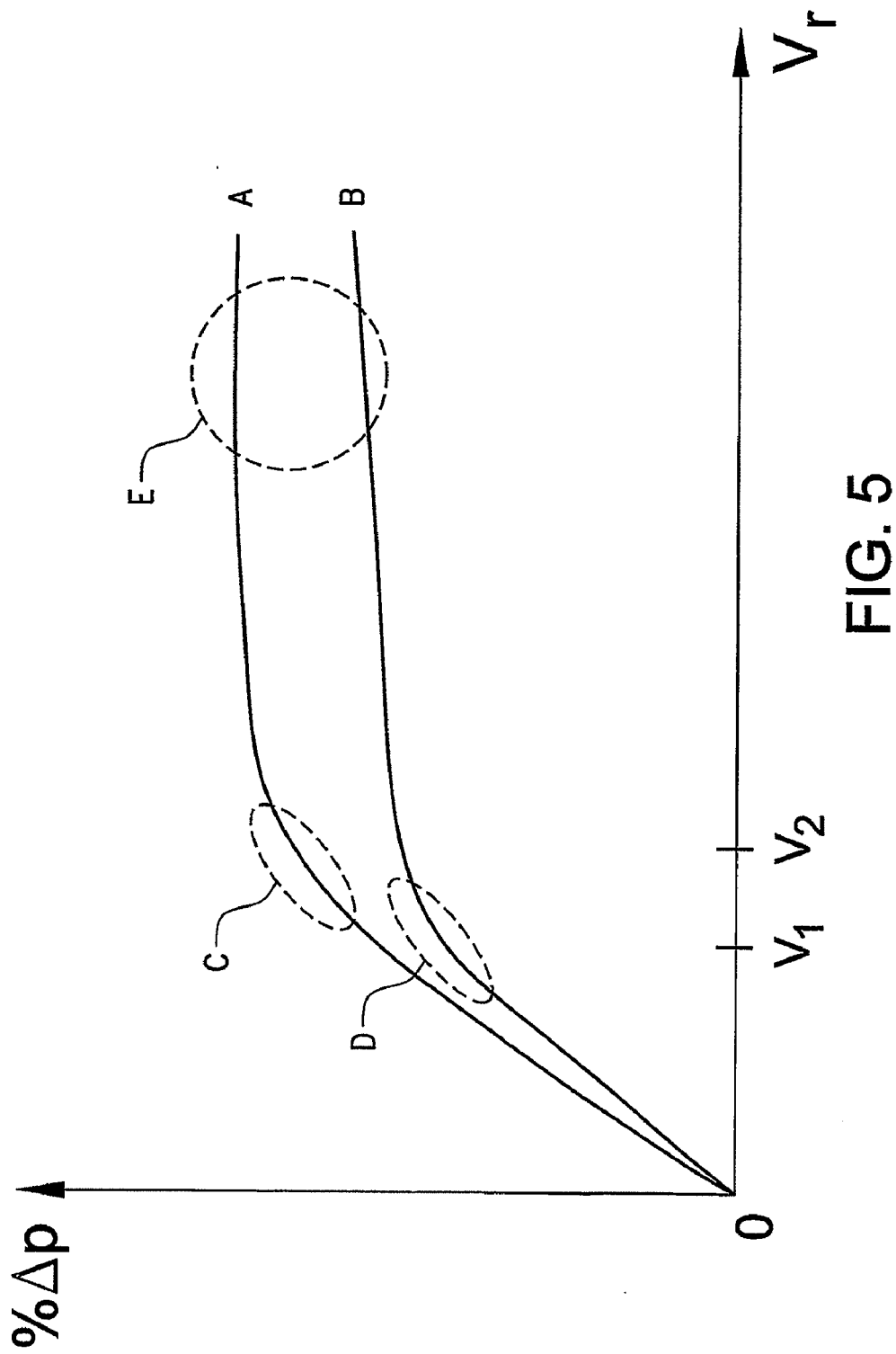
FIG. 5 shows a diagram of how the percentage increase in the drop in pressure across a catalyzer according to the embodiments according to an aspect of the invention varies depending upon the quantity of injected reductant.

The quantity of reductant that is required to carry out a satisfactory NOx regeneration changes with the aging of the NOx catalyzer. FIG. 5 shows the percentage increase in the drop in pressure (% $\delta p$) that is obtained with a certain quantity of injected reductant Vr. The upper curve A shows a stabilized NOx catalyzer (LNA) and the lower curve B shows a corresponding aged NOx catalyzer. The circled areas C and D are areas where the quantity of reductant is minimized and yet at the same time an almost complete NOx regeneration is still obtained for the respective catalyzer states (A and B). In an alternative embodiment of an aspect of the invention, the control unit 11 can be arranged to compare the most recently calculated increase in the drop in pressure δp with a stored ideal value for the increase in the drop in pressure. Both the most recently calculated increase in the drop in pressure and also the ideal value can be obtained according to any one of the embodiments described above. The ideal value is, however, produced at an earlier point in time. If the deviation between the most recently calculated increase in the drop in pressure δp and said ideal value is greater than a certain predetermined deviation, the control unit 11 selects a new ideal value by changing the quantity of injected reductant, prior to the next NOx regeneration, in such a way that the expected increase in the drop in pressure comes within a range for optimal utilization of the quantity of injected reductant, such as, for example, the range C and D representing two (A and B) of several possible catalyzer aging states. By this means, the control unit 11 is pre-programmed with the values for the quantities of reductant for the respective NOx catalyzer states (such as, for example, A and B in FIG. 5) that are required for an almost complete NOx regeneration. In this way, an almost complete NOx regeneration can be obtained for different ages of the catalyzer and with a minimized consumption of reductant. The control unit 11 is also arranged to carry out a deSOx if, during a comparison (according to what was described above), the ideal value in question is less than the abovementioned value kl1. In addition, according to yet another embodiment according to an aspect of the invention, in this situation the control unit 11 can be arranged to generate a fault code, according to the previously described embodiment according to FIG. 4, in the event of the functionality of the NOx catalyzer still being reduced.

In FIG. 5, an additional area E is circled. The circled area E shows the quantity of reductant at which a maximal increase in the drop in pressure can be obtained. A measured and recorded maximal increase in the drop in pressure can be compared with stored values for this. A value for maximal increase in the drop in pressure can form the basis for the adjustment of the quantity of reductant for normal NOx regenerations, that is, such as those according to the examples C and D in FIG. 5. The quantity of reductant according to C and D can thus be a certain predetermined percentage of the quantity of reductant that is required for said maximal increase in the drop in pressure.

Figure 6:
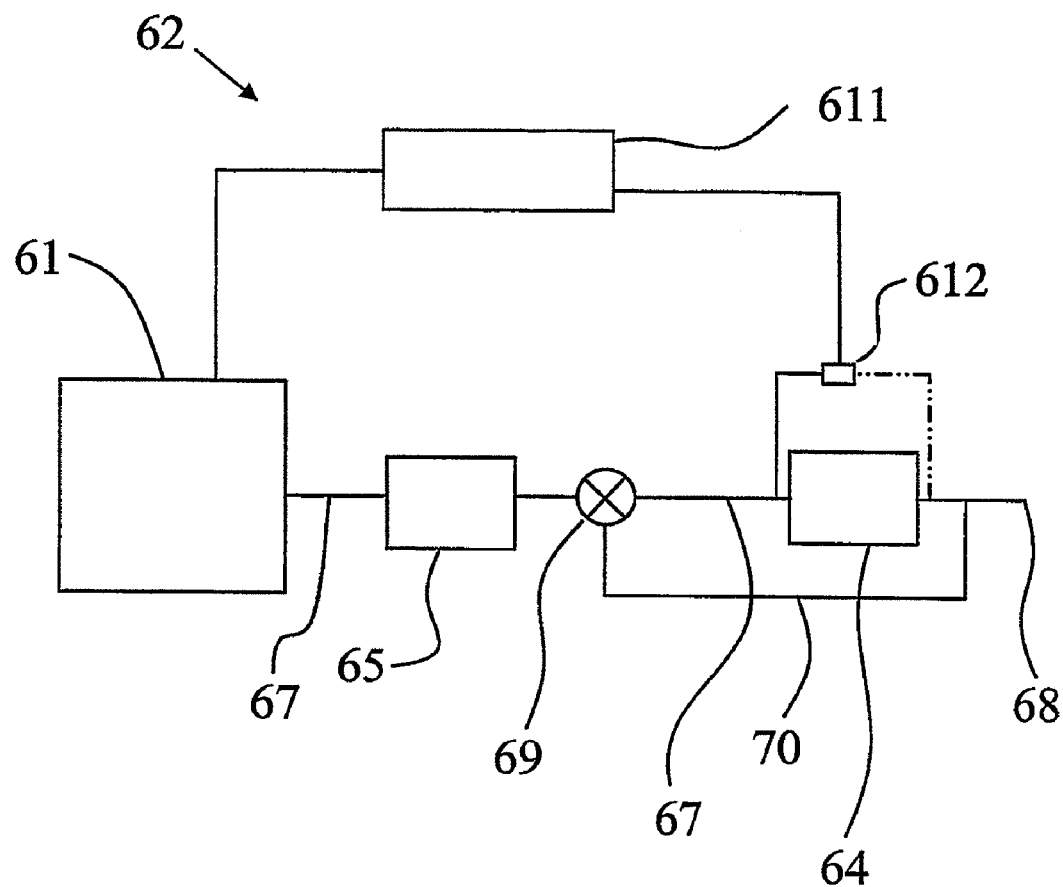

In yet another preferred embodiment of an aspect of the invention shown in FIG. 6, a bypass pipe 70 is arranged in the exhaust gas system 62, which makes it possible to take the flow of exhaust gases past the NOx catalyzer 64. In addition, there is a three-way valve 69 where the exhaust pipe divides, for directing the flow of exhaust gases to the main pipe 67 or to the bypass pipe 70. The only differences in the design between the embodiment according to FIG. 6 and the embodiment according to FIG. 1 are the three-way valve 69 and the bypass pipe 70.

Figure 7:
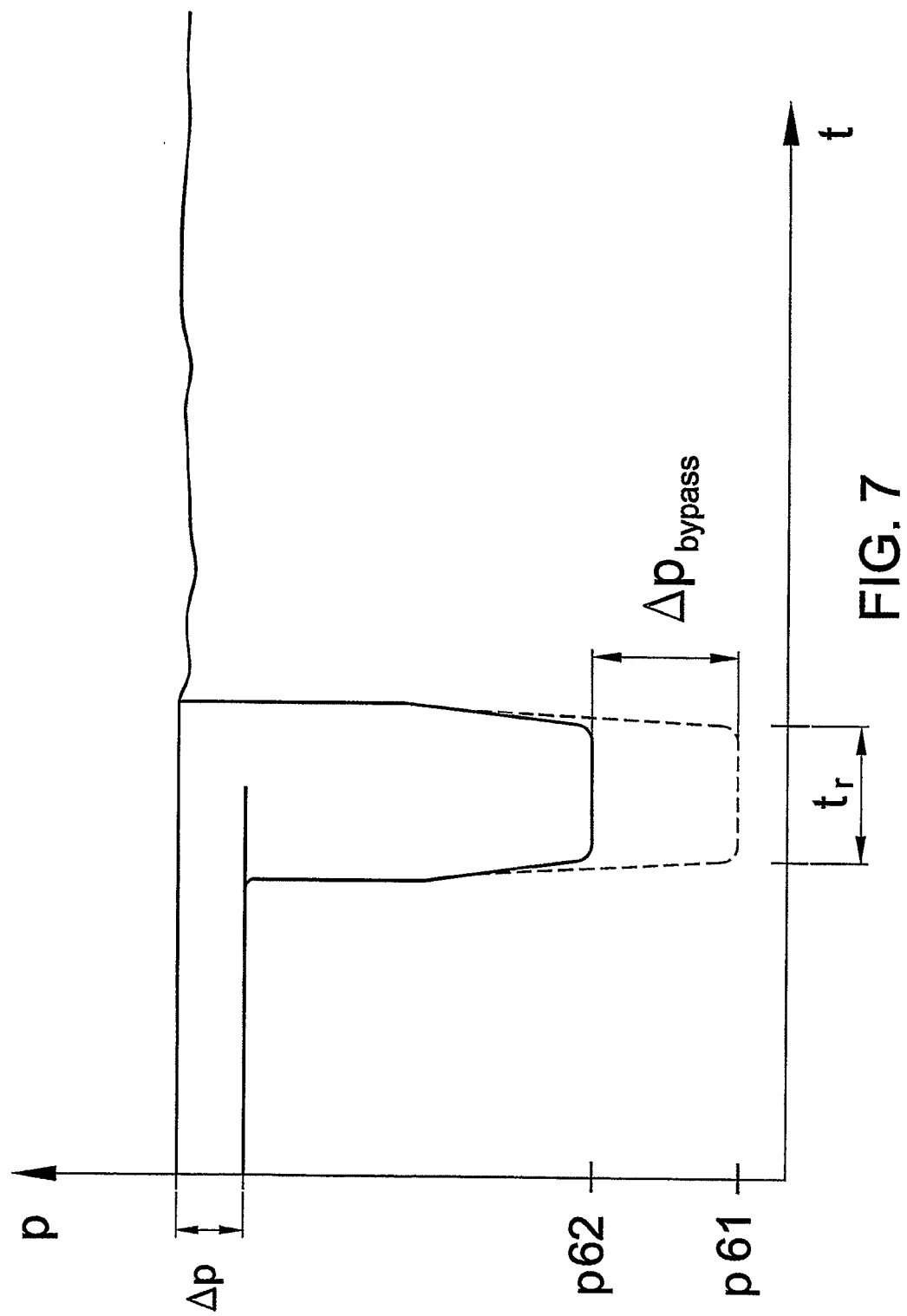

According to the embodiment in FIG. 6, the control unit 611 can also be arranged to carry out the method steps (diagnosing of the NOx catalyzer) shown in FIGS. 2 and 4 and described above. In addition to the method steps described above, according to the device in FIG. 6, the control unit 611 can also be arranged to carry out a test of the functionality of the three-way valve 69 using a pressure sensor 612. The control unit 611 is arranged to measure and record the pressure during the time that a NOx regeneration is being carried out and to compare the measured value with a stored predetermined reference value. In order for it to be possible to carry out a correct pressure measurement, the three-way valve must be set in a position where the inlet to the bypass pipe is expected to be open. FIG. 7 shows examples of pressure levels during the time (tr) that a NOx regeneration is being carried out. The measured pressure p61 represents the pressure that the pressure sensor 612 records in the event of a correctly functioning three-way valve 69, that is, a small part of the flow of exhaust gases is taken through the main pipe 67 and a greater part is taken through the bypass pipe 70. The measured pressure p62 represents a pressure level when the three-way valve is considered to have reduced functionality, that is the three-way valve 69 is not fully opened to the bypass-pipe and accordingly a smaller part of the flow of exhaust gases is taken via the bypass-pipe 70 than what was intended. The drop in pressure across the NOx-reducing catalyzer 64 is thus higher during the time that the NOx regeneration is being carried out, as the three-way valve 69 has reduced functionality. The difference between the two pressures p62 and p61 is represented in FIG. 7 by δpbypass. According to an aspect of the invention, the control unit 611 is arranged to carry out the steps according to FIG. 8 in conjunction with a NOx regeneration being carried out. In step S80, the diagnosing of the three-way valve 69 commences. In step S88, the control unit 611 ensures that the inlet to the bypass pipe 70 is opened. In step S81, the control unit 611 records that injection of reductant commences and that a NOx regeneration has thus commenced. This triggers a measurement of the drop in pressure across the NOx catalyzer, according to step S82, with an average value p62 for the drop in pressure during the time that the NOx regeneration is being carried out being recorded and stored. The end of the N0: regeneration is determined by a signal for ceasing the injection of reductant, according to step S83. In step S84, the control unit 611 carries out a calculation of the difference between the measured drop in pressure p62 and the drop in pressure p61 that normally applies for this exhaust emission control system, that is when the three-way valve 69 has full functionality. The predetermined reference value p61 is obtained by measuring the pressure across the NOx catalyzer 64 during the time when a NOx regeneration is being carried out and in a state when all the components, including the three-way valve 69, in the exhaust emission control system 62 have full functionality. If the control unit 611 finds in step S84 that the difference between p62 and p61 is less than a certain predetermined value k81, the control unit indicates in step S86 that the three-way valve 69 has sufficient functionality. If, on the other hand, the difference between p62 and p61 is greater than the value k81, the control unit 611 indicates in step S85 that the three-way valve 69 is not functioning as it should. If the control unit records a lower value than p61, this indicates that the three-way valve 69 has closed off the main pipe too much. The fault is handled in a similar way to that described above. The difference between p62 and p61 is preferably handled as an absolute value, that cannot be greater than the predetermined value k81.

To check that the three-way valve 69 can close the bypass pipe 70 completely, this is carried out at a time when the exhaust gas system has a predetermined state, for example at a cold start (after being stationary for a predetermined number of hours, that is with the combustion engine having been switched off for these hours). The control unit 611 then records a drop in pressure and compares this with a reference value (p61) in a similar way to that described above.

To check that the three-way valve 69 can close off the main pipe 67 completely, the control unit 611 requests the opening of the bypass pipe 70 and full closure of the main pipe 67, and records a drop in pressure and compares this with a reference value in a similar way to that described above.

In an embodiment of an aspect of the invention, the diagnosing of the three-way valve and the diagnosing of the NOx-reducing catalyzer are carried out in conjunction with one and the same NOx regeneration (see for example FIG. 7). Thus, according to yet another embodiment of an aspect of the invention, said diagnosing can be carried out in conjunction with two different NOx regenerations.

According to an embodiment of an aspect of the invention, the control unit 611 can be arranged to indicate the fault in the three-way valve by means of a message to the driver of the vehicle. This can be carried out in a known way by visual, acoustic or other means of communication in the cab of the vehicle.

Figure 9:
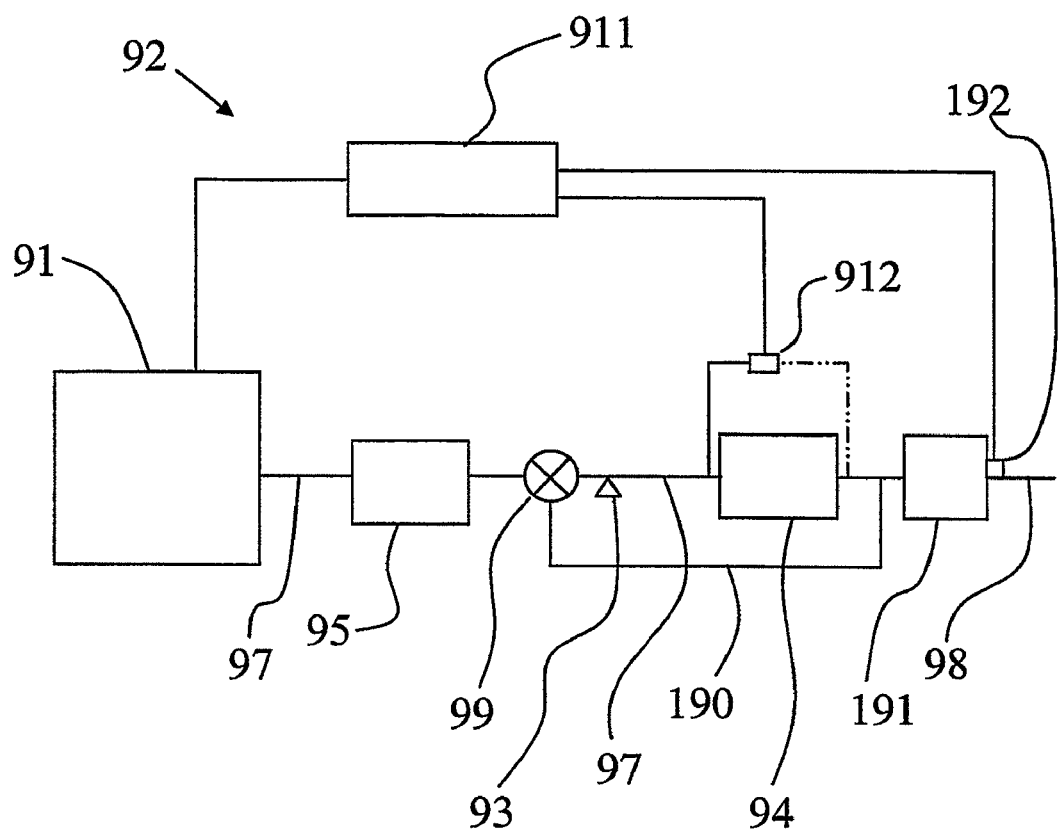

FIG. 9 shows an embodiment according to FIG. 6, but with a clean-up catalyzer 191 arranged downstream of the point where the bypass pipe 190 and main pipe 97 rejoin. In addition, the embodiment according to FIG. 9 differs from the embodiment according to FIG. 6 in that a temperature sensor 192 is arranged immediately downstream of the clean-up catalyzer 191, the outgoing signals from which can be received by the control unit 911. In the embodiment according to FIG. 9, an injector 93 for the injection of reductant is arranged in the exhaust pipe 97 between the three-way valve 99 and the NOx-reducing catalyzer 94.

Figure 10:
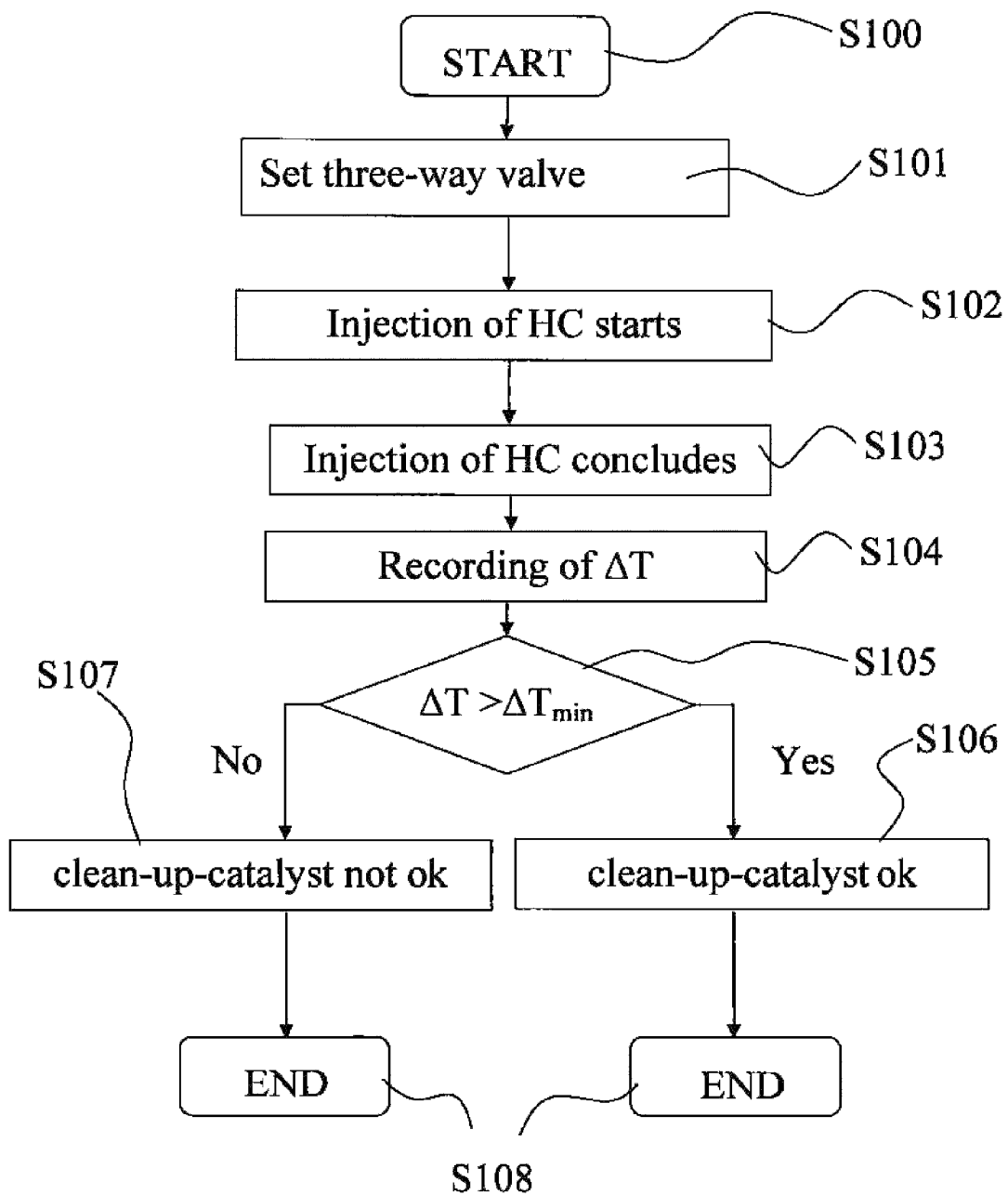

According to the embodiment in FIG. 9, the control unit 911 can also be arranged to carry out the method steps (diagnosing of the NOx catalyzer) shown in FIGS. 2 and 4 and described above. In addition to the method steps that control the deSOx functionality (diagnosing of the NOx catalyzer), according to the device in FIG. 9, the control unit 911 can also be arranged to carry out a test of the functionality of the three-way valve 99 using a pressure sensor 912, by carrying out a diagnosis according to FIG. 8. In addition, according to an aspect of the invention, the control unit 911 can be arranged to carry out diagnosing of the clean-up catalyzer 191. This is shown in greater detail in the flow chart and the method steps in FIG. 10. When the control unit 911 decides to carry out diagnosing of the clean-up catalyzer 191, the control sequence in step S100 according to FIG. 10 is started upon the next NOx catalyzer regeneration. In step S101, the control unit 911 sets the three-way valve 99 so that a partial flow of the exhaust gases is taken in through the NOx-reducing catalyzer 94 that is to be regenerated and the remaining flow of exhaust gases is taken past the NOx catalyzer 94 through the bypass pipe 190. In step S102, the NOx regeneration is commenced, by the injection of reductant via the injector 93. For this embodiment of an aspect of the invention, the control unit 911 selects a quantity of reductant that corresponds to the area E in FIG. 5. Thus a greater quantity of reductant is injected than the quantity of oxygen in the exhaust gases and adsorbed in the NOx catalyzer 94. The quantity of reductant is greater in comparison with what is actually required for a satisfactory NOx regeneration. The excess of reductant then produces a rich exhaust gas downstream of the NOx catalyzer 94, that, when mixed with the flow that does participate in the NOx regeneration, forms a gas with an excess of oxygen. This gas is taken into the clean-up catalyzer 191 where it is burnt up. The combustion in the cleanup catalyzer 191 produces a certain increase in temperature with a fully functioning clean-up catalyzer. After the conclusion of the injection of reductant in step S103, the control unit 811 records the increase in temperature δT in step S104. The recording of the increase in temperature δT is carried out in a known way using the temperature sensor 92. According to this embodiment of an aspect of the invention, the control unit 911 is arranged to have a stored predetermined limit value δTmin for the increase in temperature, which limit value indicates a minimum increase in temperature for a correctly functioning clean-up catalyzer. Thus, if the control unit 811 records a δT that is less than δTmin, this can indicate that the clean-up catalyzer is not functioning correctly. If, on the other hand, the control unit 911 records a δT that is greater than δTmin, this indicates that the clean-up catalyzer is functioning satisfactorily, in step S105, the control unit 911 compares the recorded increase in temperature δT with the predetermined δTmin. If the control unit 911 finds in step S105 that the increase in temperature δT is greater than the predetermined value δTmin, the control unit 911 indicates in step S106 that the functionality of the clean-up catalyzer 191 is satisfactory. If, on the other hand, the control unit 911 finds that the increase in temperature δT is less than the predetermined value δTmin, the control unit 911 indicates in step S107 that the clean-up catalyzer 191 is not functioning as it should. When the control unit 911 has processed step S106 or S107, the end of the program has been reached in step S108.

Figure 11:
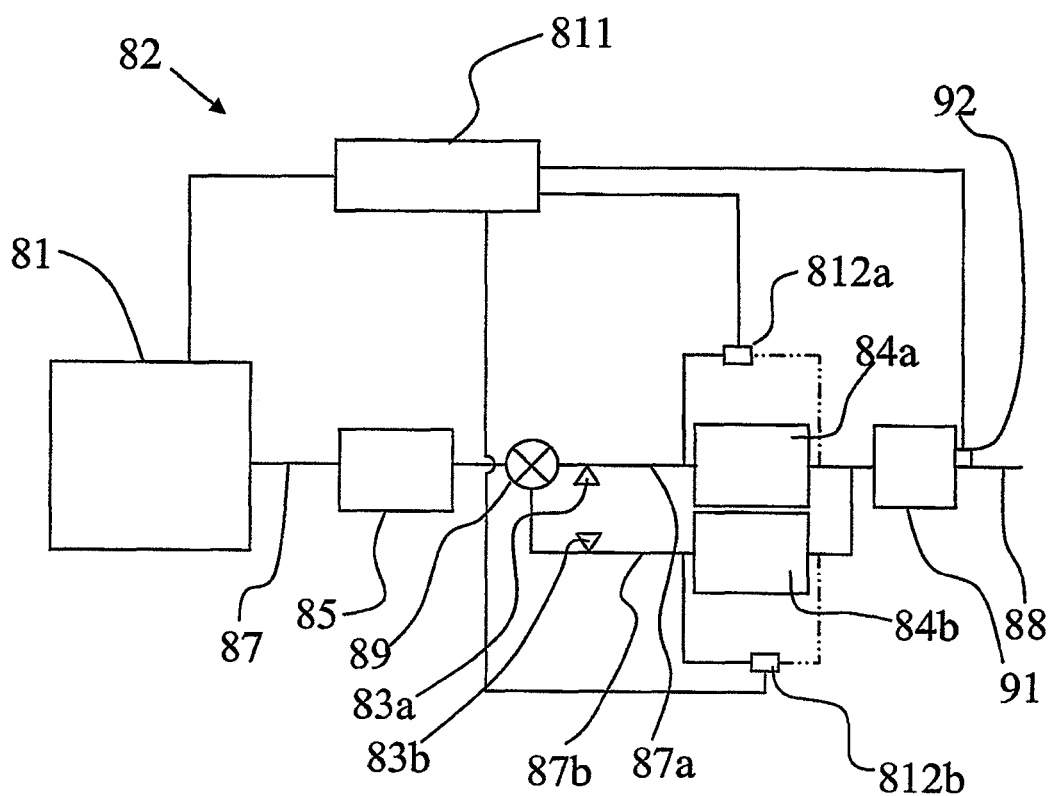

FIG. 11 shows an alternative embodiment of the embodiment according to FIG. 9. The embodiment according to FIG. 11 has twice the number of NOx catalyzers (84a and 84b), pressure sensors (812a and 812b), injectors (83a and 83b) and parts of exhaust pipes (87a and 87b). Thus, the bypass pipe 190 in the embodiment according to FIG. 9 has been removed and is replaced by the exhaust pipe 87b, the NOx catalyzer 84b and the injector 83b. In other respects, the exhaust emission control system 82 according to FIG. 11 is equivalent to the embodiment according to FIG. 9. Thus, according to the embodiment of an aspect of the invention according to FIG. 11, the control unit 811 can also be arranged to carry out the method steps (diagnosing of the NOx catalyzer) according to the embodiment in FIG. 9 that is shown in FIGS. 2 and 4 and described above. In addition to the method steps that control the deSOx functionality (diagnosing of the NOx catalyzer), according to the device in FIG. 11, the control unit 811 can also be arranged to carry out a test of the functionality of the three-way valve 89 using the pressure sensor 812a or 812b, by carrying out a diagnosis according to FIG. 8. In addition, according to an aspect of the invention, the control unit 811 in FIG. 11 can be arranged to carry out diagnosing of the clean-up catalyzer 91 according to the method steps described in FIG. 10. The control unit 811 in FIG. 11 is then arranged to carry out regeneration of one of the NOx catalyzers 84a and 84b. Thus, the other NOx catalyzer, that is not regenerated, and its exhaust pipe (87a or 87b), is used as a bypass pipe in a corresponding way to that shown in the embodiment according to FIG. 9.

In yet another embodiment according to an aspect of the invention of the embodiment shown FIG. 11, the clean-up catalyzer 91 is removed, together with the temperature sensor 92; Thus, according to this embodiment, the exhaust emission control system comprises two parallel NOx catalyzers, among other things. According to this embodiment, without clean-up catalyzer, the control unit can be arranged to carry out, according to the embodiment in FIG. 9, the method steps (diagnosing of the NOx catalyzer) shown in FIGS. 2 and 4 and described above. In addition to the method steps that control the deSOx functionality (diagnosing of the NOx catalyzer), in a similar way to the embodiment in FIG. 11, the control unit can also be arranged to carry out a test of the functionality of the three-way valve by carrying out a diagnosis according to FIG. 8 using the pressure sensor. Said diagnosing can be carried out during one and the same NOx regeneration.

Figure 8:
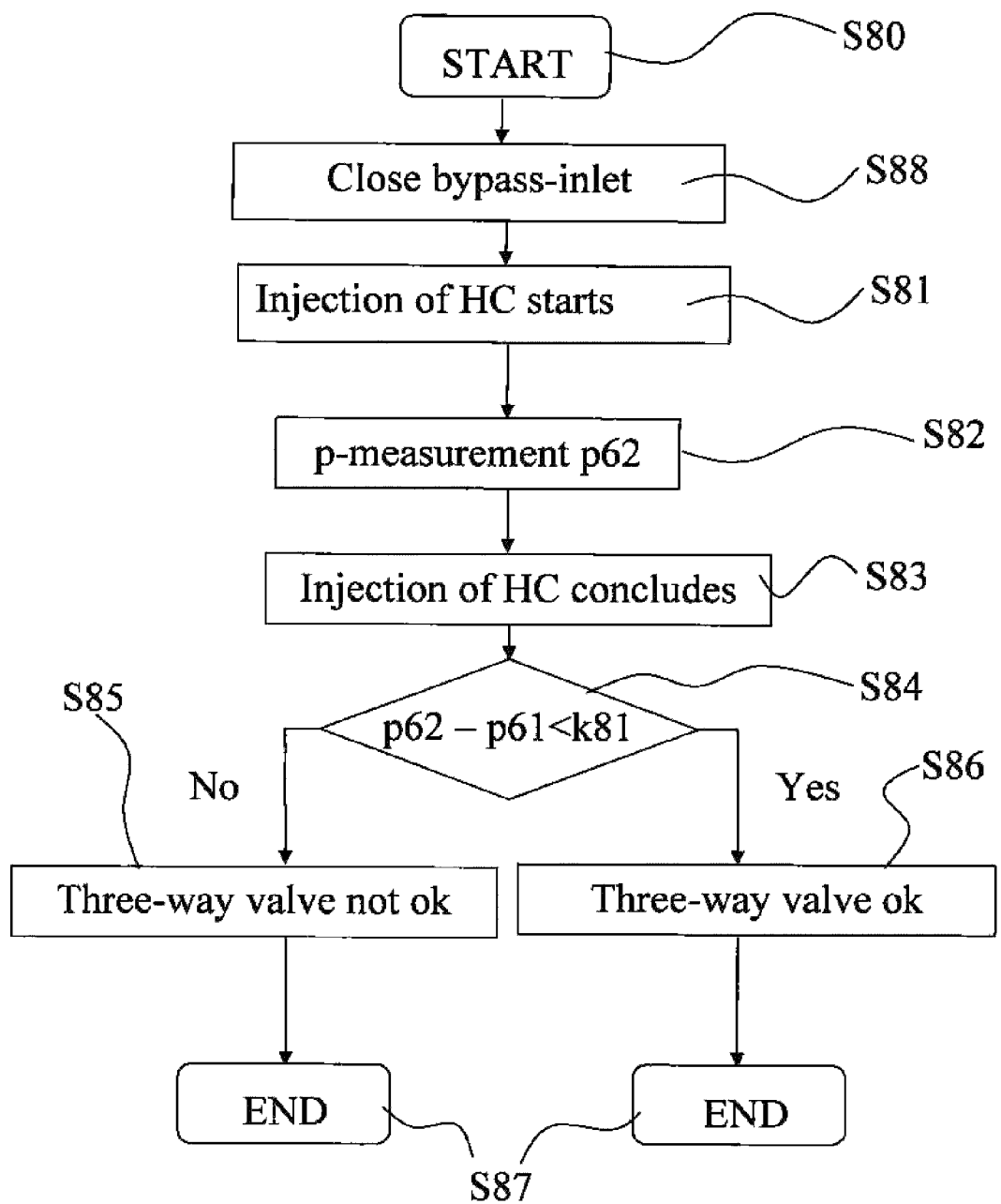

In all the abovementioned embodiments that contain the three-way valve (see FIGS. 6, 9 and 11 and the abovementioned embodiment without clean-up catalyzer and with two NOx-reducing catalyzers), according to additional embodiments of an aspect of the invention, the control unit can be arranged only to carry out the method steps according to FIG. 8, that is only to carry out the test of the functionality of the three-way valve. In a development of this embodiment with only the test of the functionality of the three-way valve, the control unit can also be arranged to carry out a test of the clean-up catalyzer (for the embodiments where a cleanup catalyzer is fitted, that is a device according to, for example, FIGS. 9 and 11).

In all the abovementioned embodiments with double NOx-reducing catalyzers, regeneration with diagnosis according to an aspect of the invention can, of course, be carried out alternately between the two NOx-reducing catalyzers comprised in the exhaust emission control system.

Figure 12:
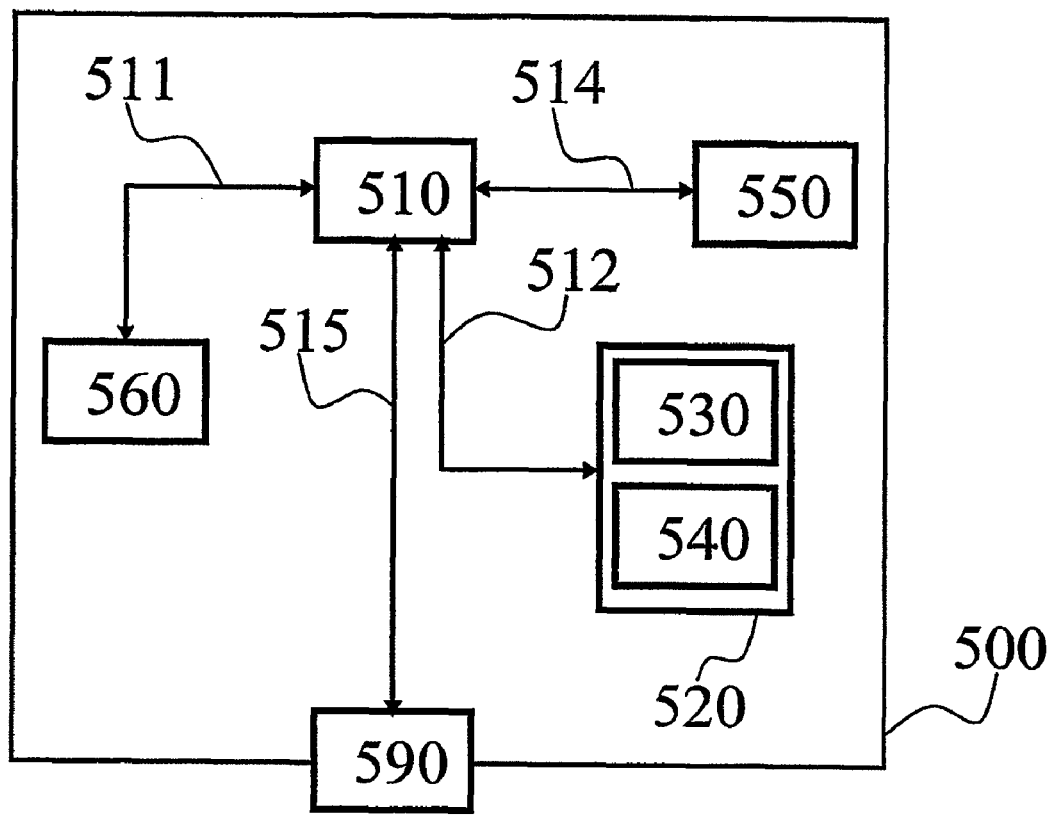
FIG. 12 shows an apparatus which is used at least in the embodiments shown in FIGS. 1, 6, 9 and 11.

FIG. 12 shows an apparatus 500, according to an embodiment of an aspect of the invention, comprising a non-volatile memory 520, a processor 510 and a read and write memory 560. The memory 520 has a first memory module 530, in which a computer program for controlling the apparatus 500 is stored. The computer program in the memory module 530 for controlling the apparatus 500 can be an operating system.

The apparatus 500 can be incorporated in, for example, a control unit, such as the control unit 11, 611 or 811 (according to both FIGS. 9 and 11). The data-processing unit 510 can comprise, for example, a microcomputer.

The memory 520 has also a second memory module 540, in which a program for diagnosing of exhaust emission control systems according to an aspect of the invention is stored.

In an alternative embodiment, the program for diagnosing of exhaust emission control systems is stored on a separate non-volatile data-storage medium 550, such as, for example, a CD or a removable semiconductor memory. The program can be stored in an executable form or in a compressed state.

When it is stated in the following that the data-processing unit 510 executes a special function, it should be clear that the data-processing unit 510 executes a special part of the program which is stored in the memory 540 or a special part of the program which is stored on the non-volatile recording medium 550.

The data-processing unit 510 is arranged to communicate with the memory 550 via a data bus 514. The data-processing unit 510 is also arranged to communicate with the memory 520 via a data bus 512. In addition, the data-processing unit 510 is arranged to communicate with the memory 560 via a data bus 511. The data-processing unit 510 is also arranged to communicate with a data port 590 via a data bus 515.

The method according to an aspect of the invention can be carried out by the data-processing unit 510 by the data-processing unit 510 executing the program which is stored in the memory 540 or the program which is stored on the non-volatile recording medium 550.

In all the embodiments described above, according to additional embodiments according to an aspect of the invention, a particulate filter unit can be arranged in the exhaust gas system. This can be placed upstream or downstream of the NOx-reducing unit, or, in the appropriate embodiments, upstream or downstream of the bypass pipe.

In an alternative embodiment of an aspect of the invention, the oxidizing catalyzer can be integrated with said particulate filter unit when the particulate filter unit is arranged upstream of the NOx-reducing catalyzer. Parts or all of the particulate filter unit can be coated with a catalytically-active material that oxidizes NO to NO2.

In yet another alternative embodiment of an aspect of the invention, the injection of hydrocarbon can be carried out simultaneously both via the engine's injectors and via one or more injectors arranged on the exhaust emission control system. However, this does not apply to the embodiment according to FIGS. 9 and 11, where only the injectors arranged between the three-way valve and the NOx-reducing catalyzer on the exhaust pipe can be used, as, according to an aspect of the invention, diagnosing of the clean-up catalyzer must also be carried out.

In yet another alternative embodiment of an aspect of the invention, an oxidizing catalyzer can be directly connected before the NOx-reducing catalyzer (4, 64, 84, 94, 84a, 84b) and can thus be a part of the system across which the measurement of the drop in pressure is carried out.

The diagnosis according to an aspect of the invention that deals with the test of the functionality of the three-way valve is not dependent upon the type of NOx-reducing catalyzer.

The hydrocarbon that is injected into the exhaust emission control system is advantageously the vehicle's fuel, which can be diesel, petrol, dimethyl ether (DME), methane (CNG), etc., but can, in the case of an injector on the exhaust pipe, also possibly be a hydrocarbon from a separate tank, which hydrocarbon is not used for the propulsion of the vehicle.

Said clean-up catalyzer 91 can comprise an oxidizing catalyzer that oxidizes (burns) emission residues primarily in the form of HC and CO. This unit can have different designs depending upon the rest of the exhaust emission control system.

The NOx catalyzer 4, 64, 84, 84a and 84b can be coated with a catalyzing layer, the purpose of which is to oxidize any remaining NO from step 2 to NO2, which NO2 can then be adsorbed in the NOx catalyzer.

In the embodiment according to FIG. 1, in an alternative embodiment, the function of the NOx catalyzer can be integrated into the particulate filter (4-way catalyzer), by the walls of the particulate filter being coated with a suitable catalyzing layer.

In additional alternative embodiments, an oxidizing catalyzer is not included in any of the abovementioned embodiments of an exhaust emission control system. Thus the diagnosing according to an aspect of the invention also works for exhaust emission control systems without oxidizing catalyzer.

The invention is not to be considered to be limited to the embodiments described above, a number of additional variants and modifications being possible within the framework of the following claims.

The invention claimed is:

1. A method carried out during operation onboard in a vehicle for diagnosing of at least a part of an exhaust emission control system, arranged in a vehicle with a combustion engine that, during operation, emits exhaust gases to the exhaust emission control system, which exhaust emission control system comprises at least one NOx-reducing catalyzer that can be regenerated, and a predetermined quantity of reductant is added to the exhaust emission control system upstream of at least the NOx-reducing catalyzer, for at least a predetermined interval of time, for regeneration of the NOx-reducing catalyzer and a drop in pressure across the NOx-reducing catalyzer is measured, which method comprises:

carrying out a first measurement and recording of a first measured value for the drop in pressure at a point in time immediately before the reductant is added to the exhaust emission control system;

carrying out a second measurement and recording of a second measured value for the drop in pressure at a point in time after the completion of the regeneration;

comparing the first and second values, and carrying out a deSOx if an increase in the drop in pressure between the first and second measured values is less than a first predetermined value.

2. The diagnosis method as claimed in claim 1, wherein a bypass pipe is arranged to take the exhaust gases past the NOx-reducing catalyzer when required and a three-way valve is arranged to direct all or parts of the exhaust gases via the NOx-reducing catalyzer or via the bypass pipe, and a clean-up catalyzer is arranged downstream of the NOx-reducing catalyzer and the bypass pipe, comprising:

setting the three-way valve to a predetermined position where a partial flow of the exhaust gases is taken in through the NOx-reducing catalyzer and the remaining flow of exhaust gases is taken past the NOx-reducing catalyzer through the bypass pipe;

injecting a larger quantity of reductant compared to what is required for a satisfactory NOx regeneration;

carrying out a measurement and recording of an increase in temperature in the cleanup catalyzer;

carrying out a comparison between the measured increase in temperature and a stored reference value for the minimum acceptable increase in temperature in the clean-up catalyzer, with a fault code being generated if the measured increase in temperature is less than the reference value for the minimum increase in temperature.

3. The diagnosis method as claimed in claim 2, wherein an additional NOx-reducing catalyzer comprised in the exhaust emission control system is arranged on the bypass pipe, wherein each the NOx-reducing catalyzer with associated part of the exhaust pipe is used alternately as a bypass pipe for diagnosing of the clean-up catalyzer.

4. The diagnosis method as claimed in claim 1, wherein at least a second increase in the drop in pressure is recorded based on the difference between a third measured value and the first measured value for the drop in pressure across the NOx-reducing catalyzer, with a fault code being generated only if the second increase in the drop in pressure is also less than the first predetermined value.

5. The diagnosis method as claimed in claim 1, wherein a degree of aging of the NOx-reducing catalyzer is recorded and compared with stored values for a corresponding minimum quantity of reductant that is required to achieve a satisfactory NOx regeneration for the NOx-reducing catalyzer, with the quantity of injected reductant being selected according to the stored values corresponding to the aging of the NOx-reducing catalyzer.

6. A method carried out during operation onboard in a vehicle for diagnosing of at least a part of an exhaust emission control system, arranged in a vehicle with a combustion engine that, during operation, emits exhaust gases to the exhaust emission control system, which exhaust emission control system comprises at least one NOx-reducing catalyzer that can be regenerated, a bypass pipe arranged to take the exhaust gases past the NOx-reducing catalyzer when required and a three-way valve arranged to direct all or parts of the exhaust gases via the NOx-reducing catalyzer or via the bypass pipe, and wherein a predetermined quantity of reductant is added to the exhaust emission control system upstream of at least the NOx-reducing catalyzer, for at least a predetermined interval of time, for regeneration of the NOx-reducing catalyzer and a drop in pressure across the NOx-reducing catalyzer is measured, which method comprises:

setting the three-way valve to an expected predetermined position according to a control signal for controlling the three-way valve;

carrying out a measurement and recording of a measured value for the drop in pressure at a point in time during the time that the reductant is being added to the exhaust emission control system;

carrying out a comparison between the measured value for the drop in pressure and a stored value, that corresponds to a drop in pressure with a correctly functioning three-way valve, and generating a fault code for the three-way valve if the difference between the measured value and the stored value is greater than a first predetermined value.

7. The diagnosis method as claimed in claim 6, wherein a clean-up catalyzer is arranged downstream of the NOx-reducing catalyzer and the bypass pipe, comprising:

setting the three-way valve to a predetermined position where a partial flow of the exhaust gases is taken in through the NOx-reducing catalyzer and the remaining flow of exhaust gases is taken past the NOx-reducing catalyzer through the bypass pipe;

injecting a greater quantity of reductant compared to what is required for a satisfactory NOx regeneration;

carrying out a measurement and recording of an increase in temperature in the cleanup catalyzer;

carrying out a comparison between the measured increase in temperature and a stored reference value for a minimum acceptable increase in temperature in the clean-up catalyzer, with a fault code being generated if the measured increase in temperature is less than the reference value for the minimum increase in temperature.

8. The diagnosis method as claimed in claim 6, wherein an additional NOx-reducing catalyzer is arranged on the bypass pipe, wherein each NOx-reducing catalyzer with associated part of the exhaust pipe is used alternately as a bypass pipe for diagnosing of the clean-up catalyzer or of the three-way valve.

9. The diagnosis method as claimed in claim 6, wherein the comparison of the measured value and the stored value for the three-way valve is carried out after the combustion engine has been switched off for a predetermined number of hours.

10. The diagnosis method as claimed in claim 1, wherein the method steps are carried out during one and the same NOx regeneration.

11. The diagnosis method as claimed in claim 2, wherein at least the steps of setting the three-way valve, injecting the larger quantity of reductant, carrying out the measurement and recording of the increase in temperature in the cleanup catalyzer, and carrying out the comparison between the measured increase in temperature and the stored reference value for the minimum acceptable increase in temperature in the clean-up catalyzer are carried out during a separate regeneration.

12. An engine-driven vehicle comprising
a combustion engine that, during operation, emits exhaust gases to an exhaust emission control system,
the exhaust emission control system comprising at least one NOx-reducing catalyzer that can be regenerated,
at least one injection device for injecting reductant into the exhaust emission control system at least upstream of the NOx-reducing catalyzer,
a pressure sensor for measurement of a drop in pressure across the NOx-reducing catalyzer,
a control unit for recording signals from the pressure sensor and for controlling at least the injection device, wherein the control unit is arranged to record via the pressure sensor a first measured value for the drop in pressure at a point in time immediately before the injecting of the reductant, and a second measured value for the drop in pressure at a point in time after the conclusion of the injecting, and wherein the control unit is arranged to carry out a comparison between the first and second measured values, and wherein the control unit is arranged to carry out a deSOx if an increase in the drop in pressure between the first and second measured values is less than a first predetermined value.

13. The engine-driven vehicle as claimed in claim 12, wherein a bypass pipe is arranged to take the exhaust gases past the NOx-reducing catalyzer when required and a three-way valve is arranged to direct all or parts of the exhaust gases via the NOx-reducing catalyzer or via the bypass pipe, and a clean-up catalyzer is arranged downstream of the NOx-reducing catalyzer and the bypass pipe, wherein the control unit is arranged to set the three-way valve to a predetermined position in which a partial flow of the exhaust gases is taken in through the NOx-reducing catalyzer and the remaining flow of exhaust gases is taken past the NOx-reducing catalyzer through the bypass pipe, to inject a greater quantity of reductant compared to what is required for a satisfactory NOx regeneration; to record an increase in temperature in the clean-up catalyzer via a temperature sensor for measuring the temperature in the clean-up catalyzer, to compare the measured increase in temperature with a stored reference value for the minimum acceptable increase in temperature in the clean-up catalyzer, and wherein the control unit is arranged to generate a fault code if a measured increase in temperature is less than the reference value for the minimum acceptable increase in temperature.

14. An engine-driven vehicle as claimed in claim 13, wherein an additional NOx-reducing catalyzer in the exhaust emission control system is arranged on the bypass pipe, wherein the control unit is arranged to use each NOx-reducing catalyzer, with an associated part of the exhaust pipe, alternately as a bypass pipe for diagnosing of the clean-up catalyzer.

15. A engine-driven vehicle comprising
a combustion engine that during operation emits exhaust gases to an exhaust emission control system,
the exhaust emission control system comprising at least one NOx-reducing catalyzer that can be regenerated,
a bypass pipe arranged to take the exhaust gases past the NOx-reducing catalyzer when required and a three-way valve arranged to direct all or parts of the exhaust gases via the NOx-reducing catalyzer or via the bypass pipe,
an injection device, for injecting reductant into the exhaust emission control system, arranged upstream of the NOx-reducing catalyzer and downstream of the three-way valve,
a pressure sensor for measuring a drop in pressure across the NOx-reducing catalyzer,
a control unit for recording signals from the pressure sensor and for controlling at least the injection device, wherein the control unit is arranged to set the three-way valve to an expected predetermined position according to a control signal for controlling the three-way valve, to record a measured value for the drop in pressure at a point in time during the time that the reductant is being added to the exhaust emission control system, to compare the measured value for the drop in pressure and a stored value, that corresponds to a drop in pressure with a correctly functioning three-way valve, and to generate a fault code for the three-way valve if a difference between the measured value and the stored value is greater than a first predetermined value.

16. The engine-driven vehicle as claimed in claim 15, wherein a clean-up catalyzer is arranged downstream of the NOx-reducing catalyzer and the bypass pipe, wherein the control unit is arranged to set the three-way valve to a predetermined position in which a partial flow of the exhaust gases is taken in through the NOx-reducing catalyzer and the remaining flow of exhaust gases is taken past the NOx-reducing catalyzer through the bypass pipe, to inject a greater quantity of reductant compared to what is required for a satisfactory NOx regeneration, to record an increase in temperature in the clean-up catalyzer via a temperature sensor, to compare the measured increase in temperature with a stored reference value for the minimum acceptable increase in temperature in the clean-up catalyzer, and to generate a fault code if the measured increase in temperature is less than said the reference value for the minimum increase in temperature.

17. The engine-driven vehicle as claimed in claim 15, in which an additional NOx-reducing catalyzer is arranged on the bypass pipe, wherein the control unit is arranged to use each NOx-reducing catalyzer, with associated part of the exhaust pipe, alternately as a bypass pipe for diagnosing of the clean-up catalyzer or of the three-way valve.

18. A non-transitory computer program product comprising program code stored on a medium that can be read by a computer for carrying out, when the computer program on the computer program product is executed by the computer, a method carried out during operation onboard in a vehicle for diagnosing of at least a part of an exhaust emission control system, arranged in a vehicle with a combustion engine that, during operation, emits exhaust gases to the exhaust emission control system, which exhaust emission control system comprises at least one NOx-reducing catalyzer that can be regenerated, and a predetermined quantity of reductant is added to the exhaust emission control system upstream of at least the NOx-reducing catalyzer, for at least a predetermined interval of time, for regeneration of the NOx-reducing catalyzer and a drop in pressure across the NOx-reducing catalyzer is measured, which method comprises:
carrying out a first measurement and recording of a first measured value for the drop in pressure at a point in time immediately before the reductant is added to the exhaust emission control system;
carrying out a second measurement and recording of a second measured value for the drop in pressure at a point in time after the completion of the regeneration; and
comparing the first and second values, and carrying out a deSOx if an increase in the drop in pressure between the first and second measured values is less than a first predetermined value.

19. A non-transitory computer program product that can be loaded directly into an internal memory in a computer, comprising a computer program for carrying out, when the computer program on the computer program product is executed by the computer, a method carried out during operation onboard in a vehicle for diagnosing of at least a part of an exhaust emission control system, arranged in a vehicle with a combustion engine that, during operation, emits exhaust gases to the exhaust emission control system, which exhaust emission control system comprises at least one NOx-reducing catalyzer that can be regenerated, and a predetermined quantity of reductant is added to the exhaust emission control system upstream of at least the NOx-reducing catalyzer, for at least a predetermined interval of time, for regeneration of the NOx-reducing catalyzer and a drop in pressure across the NOx-reducing catalyzer is measured, which method comprises:

carrying out a first measurement and recording of a first measured value for the drop in pressure at a point in time immediately before the reductant is added to the exhaust emission control system;

carrying out a second measurement and recording of a second measured value for the drop in pressure at a point in time after the completion of the regeneration; and comparing the first and second values, and carrying out a deSOx if an increase in the drop in pressure between the first and second measured values is less than a first predetermined value.

* * * * *